US008688505B1

(12) United States Patent
Kraybill

(10) Patent No.: US 8,688,505 B1
(45) Date of Patent: Apr. 1, 2014

(54) METHOD FOR CONTINUOUS SAMPLED SATISFACTION POLLING

(75) Inventor: Jeremy Kraybill, Austin, TX (US)

(73) Assignee: Boundless Network, Austin, TX (US)

( * ) Notice: Subject to any disclaimer, the term of this patent is extended or adjusted under 35 U.S.C. 154(b) by 1425 days.

(21) Appl. No.: 12/021,801

(22) Filed: Jan. 29, 2008

(51) Int. Cl.
*G06Q 10/00* (2012.01)
*G06Q 30/00* (2012.01)

(52) U.S. Cl.
USPC .................. 705/7.32; 705/7.11; 705/7.29

(58) Field of Classification Search
USPC .............................. 705/7.11–7.42
See application file for complete search history.

(56) References Cited

U.S. PATENT DOCUMENTS

| | | | |
|---|---|---|---|
| 5,596,493 A * | 1/1997 | Tone et al. | 705/7.31 |
| 6,901,424 B1 * | 5/2005 | Winn | 709/201 |
| 7,269,570 B2 * | 9/2007 | Krotki | 705/7.32 |
| 7,406,436 B1 * | 7/2008 | Reisman | 705/7.32 |
| 7,805,278 B1 * | 9/2010 | Rotondo | 702/179 |
| 2002/0077881 A1 * | 6/2002 | Krotki | 705/10 |
| 2002/0128884 A1 * | 9/2002 | Heching et al. | 705/7 |
| 2002/0156596 A1 * | 10/2002 | Caruso et al. | 702/179 |
| 2003/0229533 A1 * | 12/2003 | Mack et al. | 705/10 |
| 2005/0283394 A1 * | 12/2005 | McGloin et al. | 705/10 |
| 2008/0313010 A1 * | 12/2008 | Jepson et al. | 705/10 |

OTHER PUBLICATIONS

Ibe, Oliver C., Stochastic Petri Net Models of Polling Systems, IEEE Journal on Selected Areas in Communications, vol. 8, No. 9, Dec. 1990, pp. 1649-1657.*

* cited by examiner

*Primary Examiner* — Justin M Pats
*Assistant Examiner* — Amber A Misiaszek
(74) *Attorney, Agent, or Firm* — Spinkle IP Law Group

(57) ABSTRACT

Systems and methods for polling populations. In one embodiment, a method includes forming a respondent pool (which can be, 10% of the population), and polling the pool at first time in a roiling period. The method also includes randomly replacing a fraction (20% in some embodiments) of the respondents with respondents who were previously polled more than one rolling period ago. The poll is then repeated and the results compared with the results from about one rolling period before. The population can be small enough that the results tend to exhibit skew and kurtosis. In some embodiments, the skew can be outside of the range of −0.8 to 0.8 and the kurtosis can be either leptokurtic or platykurtic. The organization taking the poll can have an ongoing relationship with the population. Some embodiments include an order taking system for a merchant (such as a promotional goods merchant) along with a polling system.

19 Claims, 4 Drawing Sheets

METHOD FOR CONTINUOUS SAMPLED SATISFACTION POLLING

TECHNICAL FIELD OF THE INVENTION

Embodiments of the invention relate generally to continuous polling and more particularly to systems and methods for customer satisfaction and performance feedback surveying.

BACKGROUND

Many organizations poll their customers, suppliers, contractors, and employees in an attempt to determine how well the organization might be performing from the viewpoint of these entities. For instance, many merchants poll their customer base in an attempt to determine how well the organization fills orders, meets delivery deadlines, competes in terms of price, etc. Similarly, organizations some times poll their suppliers and contractors in an attempt to determine how clear their instructions are, how streamlined their procedures are, how adequate their payment methods are, etc. Likewise, employers often poll their workforce in an attempt to determine how satisfied the employees are, how well the human resource policies are implemented, and the like.

In many of these cases, the polling is done in a continuous manner. To conduct a continuous poll (such as a customer satisfaction survey or an employee "360" review) an organization sends out a survey to a number of potential respondents at a pre-determined frequency. Commonly, the organization conducts the poll on a monthly or quarterly basis. After sending the survey out, the organization waits for some time for the responses to come in. Eventually, the organization closes the survey and compiles the results.

SUMMARY OF THE INVENTION

Embodiments of the present disclosure provide systems and methods for continuous polling that eliminates, or at least substantially reduces, the shortcomings of prior art continuous polling systems and methods.

Currently available discrete polling systems and methods suffer from a number of disadvantages. For instance, currently available continuous polling systems and methods lend no visibility into trends occurring between the surveys. Nor do these continuous polls allow respondents to deliver their responses after the survey closes. Additionally, especially when an organization wishes to poll a small population, the small size of the respondent pool introduces statistical anomalies into the poll results. These anomalies can be large for polls conducted with small numbers of respondents. In many such cases, the anomalies can mask trends and other changes occurring in the population thereby preventing the polling organization from taking appropriate action (corrective action in some embodiments) in a timely manner.

Random skew and kurtosis represent some of the types of anomalies which can occur when the respondent pool is either small relative to the overall population or is small in absolute terms (regardless of the size of the overall population). Skew can describe a condition in which more responses do, or do not, appear on one side of the mean of a poll then on the other side. Kurtosis can describe a condition in which responses do, or do not, cluster closely to the mean of the poll. For large respondent pools, skew and kurtosis tend to be less of a problem since the large number of responses will usually predominate the results thereby reducing the effect of these statistical anomalies even if they are present. For small respondent pools, though, the effects of skew and kurtosis can drive the results of the poll. Thus, a need exists for improved systems and methods for continuous polling.

In some embodiments, a continuous poll can include a number of individual instances of a poll that can be identical to each other or similar in nature. These individual polls can be spread out over time. The respondents for an individual instance of a poll can be chosen in such a manner that a selected degree of continuity in the respondent pool can be maintained between individual instances of the poll while the respondent pool can be changed gradually (if desired) over the course of the continuous poll. Stability can also be provided between rolling poll periods by selecting respondents for the individual polls who responded to an individual poll (or were polled but did not respond) about one rolling period before the poll in which they are to be polled.

In some embodiments, a method for continuous polling is provided which may be used by organizations which may have an on-going, regular relationship with the respondent population; which desire continuous performance feedback; or which desire to poll a relatively small portion of a population at any given time. In some embodiments, a polling method includes constructing a continuous poll for a population of potential respondents "P" (in some embodiments, 1000 members) and in which the poll has desired rolling period "I" (in some embodiments, 100) measured in a selected unit of time U (in some embodiments, days). The method may also include selecting response tolerance period, or time "T," in which respondents may respond to the poll and after which responses may not be accepted. Response tolerance time T may be a small fraction of the rolling period I (in some embodiments, 10 days). Sample size S, which may be expressed as a percentage of population P (in some embodiments, 10%), may also be selected as part of the method.

For every unit of time U (in some embodiments, days) in which rolling period I is measured, the method may include, in some embodiments, polling the number of respondents as determined by the product of sample size S and population size P divided by rolling period I (in some embodiments, No. of respondents=$S*P/I$). In some embodiments, where the population size P is 1000, where sample size S is 10%, where rolling period I is 1000, and where units U is days, 10 respondents may be polled per day. For some embodiments, the poll continuously "rolls" through the period I so that for every unit of time U (in which the period I is measured in, hereinafter a day) a pool of respondents may be polled so that (by the end of period I) all members of population P have be polled.

For some embodiments, the results of the current individual poll can be analyzed for current conditions within population P. If comparisons with previous individual poll results are desired, many techniques are possible for doing so. In some embodiments, current results can be compared to all previous results to obtain one type of trending information in which current performance may be evaluated against historical trends. In some embodiments, the current results can be compared to the results from the poll conducted one rolling period I, less the result tolerance time T, ago to obtain another type of trending information in which the change in performance over one period can be evaluated with no, or minimal, statistical anomalies. In some embodiments, additional results are also compared to the two sets of results just discussed. These additional sets of results can also be separated by rolling period I less the response tolerance time T from each other. In some embodiments, the results can be separated from each other by the separation time defined by the following equation:

$$\text{Separation} = a*I - b*T$$

where a and b are positive or negative integers or zero. In some embodiments, historic trending information can be evaluated with no, or minimal, statistical anomalies.

In some embodiments, the method may also include selecting respondent retention rate "R" (a percentage, in some embodiments, 80%) which may indicate what fraction of the previous respondents will be retained in the respondent pool for the current instance of the poll. In some embodiments, fraction R of only those respondents who responded to the poll within the last response tolerance time T may be retained. Those respondents who will not be retained can be replaced with randomly selected respondents from the un-polled portion of the population. Thus, in some embodiments wherein respondent retention rate R equals 80%, eight of the respondents from the respondent pool of one day would be retained in the respondent pool for the next day. The other 20% of the respondent pool for the next poll could be selected randomly for replacement by un-polled and (randomly selected) members of population P. In some embodiments, the randomly selected replacements could have been polled, but, at a time more than one rolling period I ago. The replacements may also be selected from the portion of population P which has not been polled for a time about equal to (or greater than) the sum of rolling period I and response tolerance time T (in some embodiments, I+T). In some embodiments, the replacements could have been polled within one rolling period I, plus-or-minus response tolerance time T, (in some embodiments, from a time within the range I−T to I+T) ago.

At the beginning of continuous poll of some embodiments, a pool of respondents sized at sample size S times population size P (in some embodiments, S*P) may be selected either at random or based on demographic profiles consistent with full population P. This initial group of respondents may be designated as the "seed population." Every day during initial rolling period I a different portion of the seed population equal in size to the pool size S*P divided by rolling period I (in some embodiments, S*P/I) can be polled. In some embodiments, if population size P is 10,000, sample size S is 10%, and the rolling period I is 1 day, the seed population would include 1000 respondents polled in 1 day. In some embodiments, if rolling period I were 100 days then every day 10 respondents could be selected at random and polled until all respondents of the seed population had been polled once. Once the initial rolling period ends, in some embodiments, all members of the seed population will have been polled.

For some embodiments, after the seed population has been polled, fraction R of the respondents in the previous respondent pool may be retained and the remaining fraction (1−R) of the respondents randomly replaced for the next poll. The replacements may be chosen from the un-polled portion of population P (or who have never responded to a poll) until all members of the population have been polled. If the entire population has been polled, then the replacements can be chosen from those who were polled (or responded) more than one rolling period I, plus response tolerance time T, ago (in some embodiments, I+T days ago).

In some embodiments, eight of the previous (and randomly selected) respondents could be retained for polling in the next instance of the poll and two respondents could be replaced with randomly chosen members of population P who had not been polled before, or who had been polled more than 110 days ago (depending on whether the entire population P has been polled).

Embodiments of the disclosure thus allow the set of results from an individual instance of the poll to be compared to sets of results of previous polls which may be separated in time by rolling period I or some variation there from (in some embodiments, rolling period I less results tolerance time T). Embodiments of the disclosure also reduce misleading skew, misleading kurtosis, and other anomalies which might be caused by a small population P or a small respondent pool size (in some embodiments). Variances in the results of the polls are therefore more likely to be attributable to population changes, performance changes, changes in the perception of the population, etc. rather than (in some embodiments) statistical anomalies. With the embodiments described herein, improved polling results may be obtained in general and, in particular, with regard to subtle changes in the behavior of the polled population which might otherwise be obscured by statistical anomalies such as skew and kurtosis. Embodiments described herein also provide polling methods and systems which allow polling with smaller respondent pools than heretofore possible while providing improved accuracy in the results. Thus, organizations seeking performance feedback may better judge their performance while expending fewer resources to conduct the polling which underlies the feedback.

BRIEF DESCRIPTION OF THE FIGURES

A more complete understanding of the disclosure and the advantages thereof may be acquired by referring to the following description, taken in conjunction with the accompanying drawings in which like reference numbers generally indicate like features and wherein.

DETAILED DESCRIPTION

Figure 1:
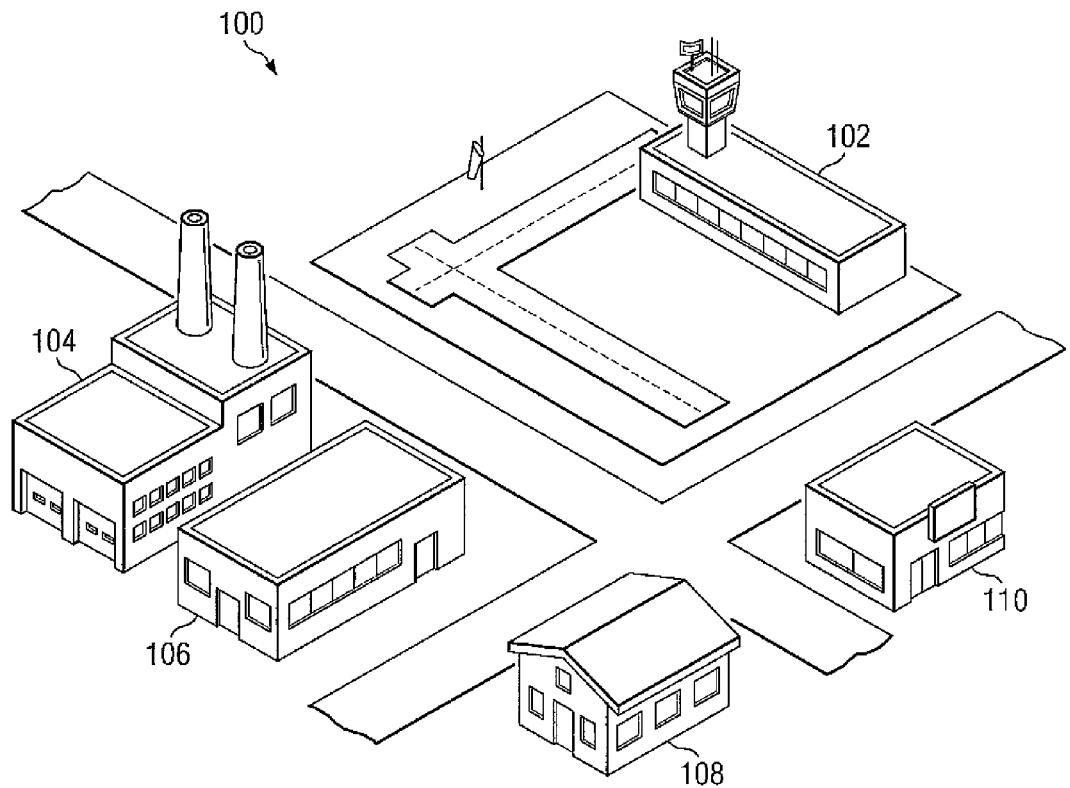
FIG. 1 is a perspective view of a population to be polled.

Preferred embodiments of the disclosure are illustrated in the FIGURES, like numerals generally being used to refer to like and corresponding parts of the various drawings. Embodiments of the disclosure provide systems and methods for conducting continuous rolling polls.

Before discussing specific embodiments, an embodiment of a hardware architecture for implementing certain embodiments is described herein. One embodiment can include a computer communicatively coupled to a network (the Internet in some embodiments). As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylist, etc.), or the like. In various embodiments, the computer has access to at least one database over the network.

ROM, RAM, and HD are computer memories for storing computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

The functionalities and processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of complied C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. In some embodiments, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. In some embodiments, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

FIG. 1 depicts population 100 from which an organization might want to gather information via a poll of selected respondents within population 100. In some embodiments, the organization can be a promotional products merchant, a drop-ship merchant, an employer, etc. As shown in FIG. 1 Population 100 can include a variety of respondents or organizations with which the individual respondents are associated. FIG. 1 shows that population 100 can include representatives from airport 102, factory 104, office 106, civic organization 108, department store 110, etc. Any of respondents 102, 104, 106, 108, and 110 might have an ongoing relationship with the polling organization. In some embodiments, if the polling organization were a promotional products merchant, then the members of the population might from time-to-time order promotional products from the polling organization.

Each population member 102, 104, 106, 108, and 110 may differ from the others in a number of ways. In some embodiments, airport 102, factory 104, and office 106 might have relatively sizeable budgets for ordering promotional products. Civic organization 108 and department store 110, on the other hand, might have comparatively limited budgets for such matters. Another way in which population members 102, 104, 106, 108, and 110 might differ is that there may be many more smaller members such as civic organization 108 than larger members such as airport 102. In some embodiments wherein population members 102, 104, 106, 108, 110 might differ, some population members such as airport 102 may be a governmental organization while other population members 104, 106, 108, and 110 might be private or corporate organizations or the like. Some population members (civic organization 110 in some embodiments) might place a member or committee in charge of interacting with the polling organization whereas other population members (such as airport 102) might place a person of some level of responsibility (in some embodiments, a director, CEO, president, secretary, etc) in charge of interacting with the polling organization. Many other differences can exist between population members 102, 104, 106, 108, and 110. Each difference between members can cause a respondent to respond to the same poll in a different manner than the other members. These differing responses (even if the perception of the organization is substantially the same between respondents) can introduce anomalies such as skew and kurtosis into the results of the poll.

In conducting the poll, the organization might find that the responses from individual respondents (who represent their respective population members 102, 104, 106, 108, and 110)) varies widely at any given time and, or, across a span of time even for the same member 102, 104, 106, 108, and 110. Depending on the respondents chosen for the respondent pool of any given poll, the results might vary despite a steady perception of the polling organization by overall population 100. If the size of population 100, the absolute size of the respondent pool, or the size of the respondent pool relative to population 100 decreases, the variability of the results can be expected to increase.

Figure 2:
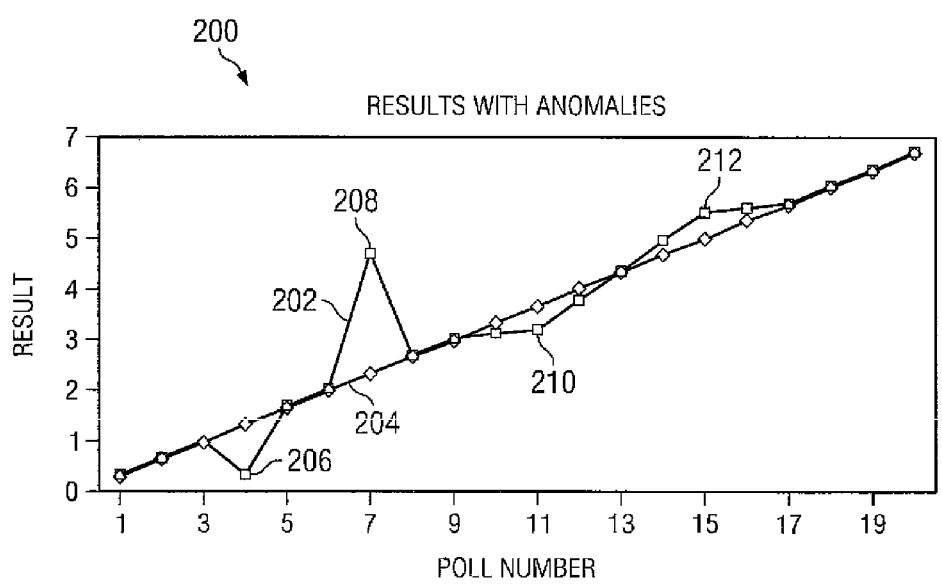
FIG. 2 is a graph illustrating anomalies in the results of a poll.

With regard to FIG. 2, some variability appears in results 200 of a poll. Results curve 202 of FIG. 2 reflects an overall trend as shown by line 204 and can be based on other, underlying data. Results 200 could reflect other results (in some embodiments, results 300 and 400 in FIGS. 3 and 4 which have been compiled over time from a continuous poll). Trend 204 could be any sort of trend (increasing, decreasing, steady state, etc). In some embodiments, the trend 204 is a steady increase in the results 200 of the poll. Results 202 reflect several potential variances 206, 208, 210, and 212. Variances 206 and 208 each occurred during a particular poll (in some embodiments, polls 4 and 7 respectively) but with opposite signs. Variances 210 and 212 are relatively spread out having occurred over three polls each, again with opposite signs. Whether these variances 206, 208, 210, and 212 are due to statistical anomalies or underlying changes in the perception of the organization by population 100 may not be readily apparent. Variances 206, 208, 210, and 212, if they are due to statistical anomalies, might mask the actual perceptions (whether changing or steady) of the population. It is also possible that a variation could mask an actual change with the opposite sign so that trend 204 appears unaffected when in fact it has been disturbed. An anomaly might instead aggravate an actual performance change if the anomaly and actual change have the same sign.

Figure 3:
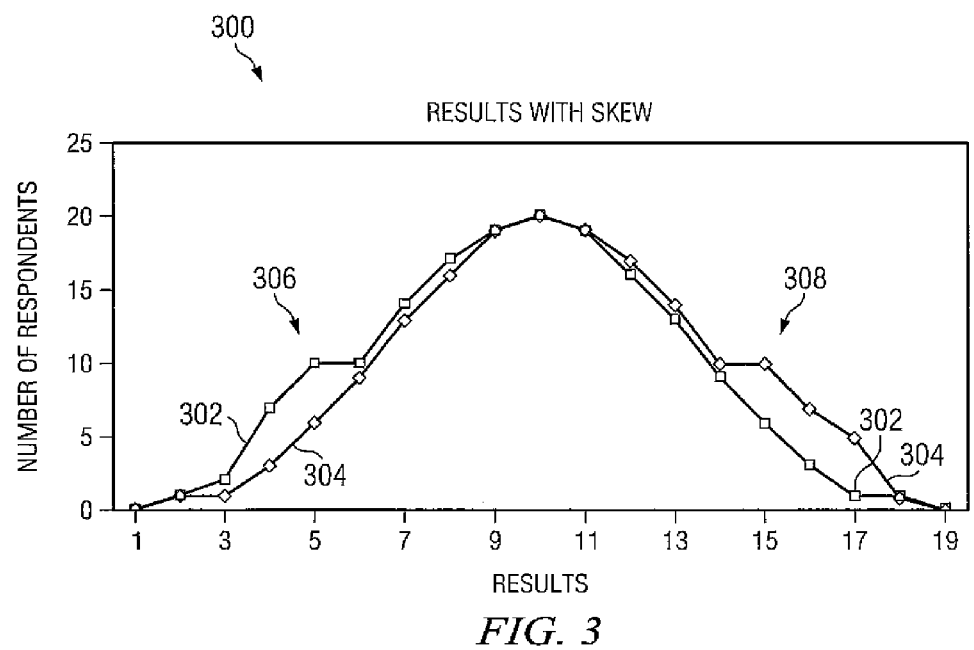
FIG. 3 is a graph illustrating skew in the results of a poll.

FIG. 3 illustrates the effects of one type of anomaly, skew, in results 300 of a poll or other statistical data. The distribution of the actual results (not shown) for the entire population may be assumed, in many cases, to be statistically "normal" (in some embodiments, the distribution can be represented by a bell shaped curve). In FIG. 3 such a normal bell shaped curve would lie between curves 302 and 304 but is not shown for clarity. The mean of such a normal curve for the data shown might lie at approximately 10. Such a normal curve would not exhibit lobes 306 and 308 which appear on curves 302 and 304. Lobes 306 and 308 cause the mean of curves 302 and 304 to shift to the left or right, respectively of the mean for the entire population. Left skewed curve 302 and right skewed curve 304 have means shifted, respectively, to the left and right of the mean for the entire population. In some embodiments, the means of curves 302 and 304 could be at about 9.5 and 10.5 respectively due to the non-normal distribution reflected by lobes 306 and 308. If lobes 306 and 308 occurred because the respondent pool was small, or dominated by a particular population member's unique characteristics, results curve 202 of FIG. 2 (which may summarize many results 300 of FIG. 3 taken over time) might show an anomaly 206, 208, 210, or 212.

Figure 4:
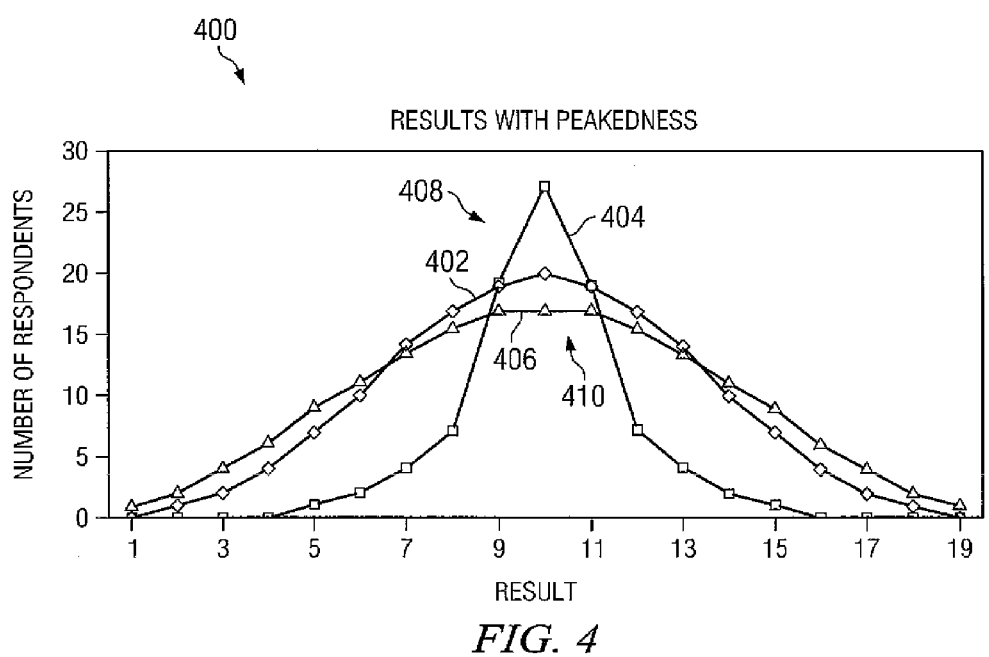
FIG. 4 is a graph illustrating kurtosis in the results of a poll.

FIG. 4 shows another set of poll results 400 which, when compared, illustrates an anomaly known as kurtosis (or colloquially as "peakedness"). In FIG. 4, bell shaped curve 402 represents the responses if the distribution of the responses is normal. Curve 404 illustrates that a non-normal number of responses occurred near the mean by including a relatively acute peak 408 near the mean. Curve 406 illustrates that a low number of responses relative to the norm occurred near the mean by including a relatively flat region 410 near the mean. Results with a distribution similar to curve 404 (in some embodiments, exhibiting a peak 408) may be deemed to be leptokurtic while distributions similar to curve 406 (such as those exhibiting a flat or rounded distribution 410) may be deemed to be platykurtic. Depending on what results 200 of FIG. 2 illustrate about the results 400 of FIG. 4, the abnormal distributions of either curve 404 or 406 may cause an anomaly 206, 208, 210, or 212. In some embodiments, if curve 200 depicts the standard deviation of results 400, the kurtosis of curves 404 and 406 might cause or contribute to anomalies 206, 208, 210, or 212.

FIG. 1 illustrates that population 100 for a given poll might sometimes be statistically small. FIG. 1 also illustrates that population 100 can be characterized by a number of members with many characteristics in common and a few, perhaps significant, members with little in common with the remainder of population 100 other than having an on-going relationship with the polling organization. In either type of population 100, and for other reasons, the choice of the size of the respondent pool and the choice of the respondents within the respondent pool may therefore introduce random variations (such as skew as illustrated by FIG. 3 or kurtosis as illustrated by FIG. 4) into the results of the polls of population 100. These random variations, which do not necessarily reflect the state of the entire population 100, may cause anomalies 206, 208, 212, and 214 in poll results 202 of FIG. 2. A need therefore exists to reduce, or eliminate, the effects of the size of the respondent pool and the choice of the respondents within that pool on the results 200, 300, and 400 of polls.

Figure 5:
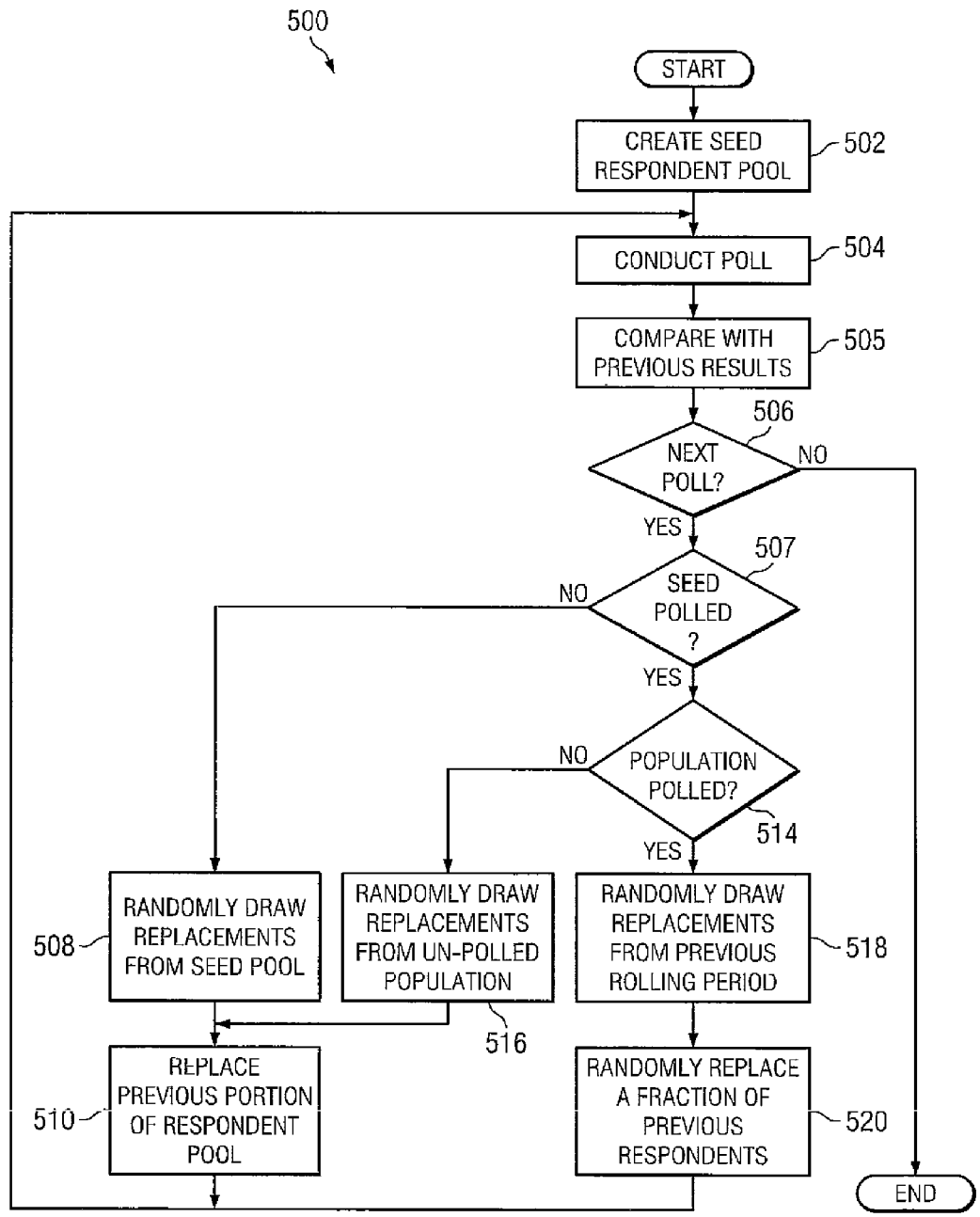
FIG. 5 is a flowchart illustrating a method of conducting a continuous rolling poll.
Figure 6:
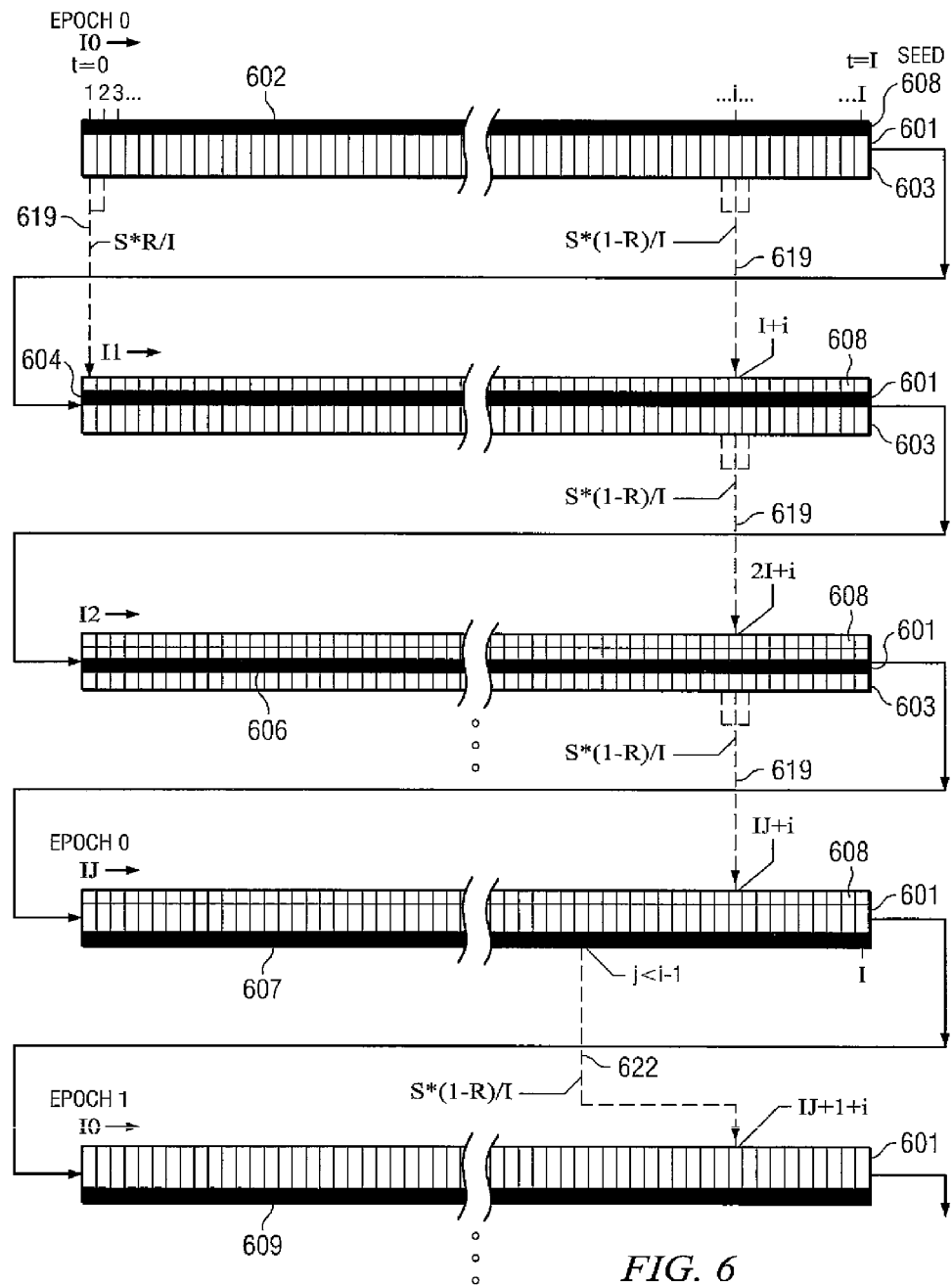
FIG. 6 is a block diagram illustrating a continuous rolling poll.

In some embodiments, the respondents for a poll are chosen in such a manner that some continuity in the respondent pool can be maintained between individual instances of the poll while gradually changing the respondent pool over the course of a continuous poll. Stability can also be provided between rolling poll periods by selecting respondents for the respondent pool who responded to the poll (or were polled but did not respond) about one rolling period ago. FIG. 5 illustrates method 500 of some embodiments for conducting a continuous rolling poll. In some embodiments, method 500 reduces, if not eliminates, the effects of skew, kurtosis, and other anomalies in poll results 200, 300, and 400. Method 500 may be conducted on population 601 of FIG. 6 in some embodiments. FIG. 6 shows population 601 and several respondent pools 602, 604, 606, 607, and 609 of population 601. FIG. 6 also shows seed population 608 which, in some embodiments, may be initial respondent pool 602. FIG. 6 has been divided into epochs 0 and 1 (with subsequent epochs not shown) within which a number J of rolling periods I can be included in some embodiments. J may be a number such that all members of population 601 will have been polled during an epoch when that epoch ends. I individual instances of the poll may also be included within each rolling period I in some embodiments.

Method 500 may begin in some embodiments with creating seed population 608 at step 502. The members of seed population 608 in initial rolling period $I_0$ of Epoch 0 can be drawn randomly from population 601 or the members can be selected based on their demographic profile relative to the demographics of population 601. An initial instance of the poll can then be conducted by polling, in some embodiments, portion 1 of seed population 608 at step 504. Since this instance of the poll can be the first of many instances, the results comparison at step 505 need not be performed. However, if previous poll results are available (whether gathered in accordance with method 500 or not), the current results can be compared to historic poll results at step 505. If no further polls are desired, method 500 may terminate as shown by step 506.

If it is desired that polling continue, method 500 may proceed. At steps 507 and 508, FIG. 5 shows that if the entire seed population 608 has not been polled, replacements for some or all of the previous respondents may be chosen randomly from seed population 608. In some embodiments, portion 2 of seed population 608 may be selected for the next instance of the poll at step 508. In step 510, portion 2 of seed population 608 may replace portion 1 for the next instance of the poll to be conducted at step 504. With two or more sets of poll results in hand, the sets of poll results can be compared as shown at step 505. Portion 3 of seed population 608 may replace portion 2 and the poll can be conducted again with such replacements and re-polling occurring via steps 507, 508, 510, and 504) until the entire seed population 608 has been polled with the polling of portion I of seed population 608 at the end of rolling period $I_0$.

If it is determined at step 507 that all members of seed population 608 have been polled, then polling of remaining un-polled portion 603 of population 601 may begin as shown by rolling period $I_1$. A check can be performed to determine if population 601 has been completely polled at step 514. In some embodiments, it is assumed that at least some population 601 members have not been polled. It might be the case that only seed population 608 has been polled at this initial performance of step 514. The next portion (here portion 1) of respondent pool 604 for rolling period may be composed of two groups of respondents. In some embodiments, one group 619 may include fraction R of the respondents who were polled within response tolerance period or time T of one rolling period I ago. This time range corresponds to portions 1 and 2 of seed population 608 and any population 601 member who happened to be polled (with, in some embodiments, a polling method different than method 500) within response tolerance time T before rolling period $I_0$ began. In one embodiment, those respondents who were polled prior to the beginning of method 500 may be excluded from consideration as replacements. Remaining fraction (1−R) of portion 1 of respondent pool 604 may be chosen randomly from the un-polled population 603 at step 516. In some embodiments, replacements 619 Portion 1 of respondent pool 604 can then replace portion I of seed population 608 as the current portion 1 of respondent pool 604 at step 510. Another instance of the poll can be conducted and the results can be compared to previous results at steps 504 and 505 respectively. Steps 514, 516, 510, and 504 may then be repeated for each instance i of the poll and portion i of respondent pool 604 for rolling period $I_1$. Another rolling period $I_2$, in some embodiments, can begin with respondent replacement and retention continuing within respondent pool 609 in a substantially similar manner.

In some embodiments, after a number J of cycles through method 500, it may be determined that all members of population 601 have been polled at step 514. Such a condition is illustrated by portion I of respondent pool 607 of rolling period $I_j$ and epoch 0 at which time un-polled portion 603 of population 601 no longer exists. Method 500, in some embodiments, may include a different respondent replacement technique for situations wherein all population 601 members have been polled. In some embodiments, portion 1 of respondent pool 609 of rolling period $I_0$ (now of epoch 1) may include randomly selected fraction 1-R of respondents 622 who responded to a poll greater than the sum of rolling period I and response tolerance time T (I+T) ago. Fraction R of respondent pool 609 may include randomly selected respondents from the previous instance of the poll. FIG. 6 illustrates that, in some embodiments, a fraction of portion i of respondent pool 609 may be drawn from portion j (where j≤I−1) of respondent pool 607 where j corresponds to the poll conducted rolling period I plus response tolerance time T (or greater) ago. An instance of the poll may be conducted at step 504. Respondent replacement and re-polling may repeat for all I portions of rolling period $I_0$ and epoch 1.

In some embodiments, polling continues for subsequent rolling periods beyond rolling period $I_0$ of epoch 1. At any time, at step 505, polling results from the trailing I−1 polls (corresponding to a time frame from one rolling period I ago less response tolerance time T ago to the present) can be compared to the preceding trailing I−1 polls (corresponding to a time frame from two rolling periods I less response tolerance time T ago to the beginning of the first group of polls) with confidence that any variances between the results can be attributed to actual perception or performance changes rather than statistical anomalies such as skew and kurtosis. In some embodiments, trending data may be obtained by comparing additional groups of I−1 poll results to the latest I−1 results.

Although embodiments have been described in detail herein, it should be understood that the description is by way of example only and is not to be construed in a limiting sense. It is to be further understood, therefore, that numerous changes in the details of the embodiments and additional embodiments will be apparent, and may be made by, persons of ordinary skill in the art having reference to this description. It is contemplated that all such changes and additional embodiments are within scope of the following claims and their legal equivalents.

What is claimed is:

1. A method of continuous polling of a population, the method comprising:
at a polling computer coupled to a network and having a processor and a memory storing a set of instructions executable by the processor, performing the steps of:
storing in the memory a first respondent pool from a population, wherein each respondent in the first respondent pool is selected based on a relationship with the operator of the polling computer;
polling a first set of respondents in the first respondent pool, wherein the number of respondents in the first set of respondents is calculated as:

$$N = \frac{S * P}{I},$$

wherein S is the sample size, P is the population size, and I is a rolling period formed with one or more units, wherein the number of units in the rolling period is less than or equal to the number of respondents in the respondent pool, wherein polling includes:
sending, by the polling computer, a poll with a set of questions;
receiving, by the polling computer, a first set of responses;
analyzing, by the polling computer, the first set of responses to determine a statistical distribution of the first set of responses;
storing, by the polling computer, the analysis of the first set of responses in the memory;
replacing a portion of the first set of respondents with a set of replacement respondents from an unpolled portion of the population to form a second respondent pool;
polling the second respondent pool;
receiving, by the polling computer, a second set of responses;
analyzing, by the polling computer, the second set of responses to determine a statistical distribution of the second set of responses;
comparing the analysis of the first set of responses to the analysis of the second set of response to determine a statistical relationship; and
storing, by the polling computer, the analysis of the first set of responses, the analysis of the second set of responses, and the statistical relationship in the memory.

2. The method of claim 1, wherein the set of replacement respondents were previously polled more than one rolling period ago.

3. The method of claim 1, wherein the set of replacement respondents is selected to replace respondents who did not respond to a current instance of the poll.

4. The method of claim 3, wherein less than 10% of the first set of respondents are replaced, wherein the method further comprises comparing the analysis corresponding to the second set of respondents with the most recent previous analysis to identify information.

5. The method of claim 1, further comprising comparing the analysis corresponding to the second set of respondents with all previous analyses to obtain trending information.

6. The method of claim 1, further comprising defining a response tolerance time, wherein a response received by the polling computer after the response tolerance time is not analyzed.

7. A system for continuous polling of a population, the system comprising:
a polling computer having a processor and coupled to a network; and
a memory storing a first respondent pool selected from a population, each respondent in the population having a relationship with the operator of the polling computer, wherein the polling computer is configured to:
poll a first set of respondents in the first respondent pool, wherein the number of respondents in the first set of respondents is calculated as:

$$N = \frac{S*P}{I},$$

wherein S is the sample size, P is the population size, and I is a rolling period formed with one or more units, wherein the number of units in the rolling period is less than or equal to the number of respondents in the respondent pool, wherein polling includes:
sending, by the polling computer, a poll with a set of questions;
receiving, by the polling computer, a first set of responses;
analyzing, by the polling computer, the first set of responses to determine a statistical distribution of the first set of responses;
storing, by the polling computer, the analysis of the first set of responses in the memory;
replacing a portion of the first set of respondents with a set of replacement respondents from an unpolled portion of the population to form a second respondent pool;
polling the second respondent pool;
receiving, by the polling computer, a second set of responses;
analyzing, by the polling computer, the second set of responses to determine a statistical distribution of the second set of responses;
comparing the analysis of the first set of responses to the analysis of the second set of response to determine a statistical relationship; and
storing, by the polling computer, the analysis of the first set of responses, the analysis of the second set of responses, and the statistical relationship in the memory.

8. The system of claim 7, wherein the set of replacement respondents were previously polled more than one rolling period ago.

9. The system of claim 7, wherein the set of replacement respondents is selected to replace respondents who did not respond to a current instance of the poll.

10. The system of claim 9, wherein less than 10% of the first set of respondents are replaced, wherein the polling computer is further configured to compare the analysis corresponding to the second set of respondents with the most recent previous analysis to identify information.

11. The system of claim 7, wherein the polling computer is further configured to compare the analysis corresponding to the second set of respondents with all previous analyses to obtain trending information.

12. The system of claim 7, further comprising defining a response tolerance time, wherein the polling computer is configured to not accept a response received after the response tolerance time is expired.

13. A computer program product comprising a non-transitory tangible storage medium storing computer program instructions executable to perform a method of continuous polling of a population, comprising:
storing in a memory on a polling computer a first respondent pool from a population, wherein each respondent in the first respondent pool is selected based on a relationship with the operator of the polling computer;
polling a first set of respondents in the first respondent pool, wherein the number of respondents in the first set of respondents is calculated as:

$$N = \frac{S*P}{I},$$

wherein S is the sample size, P is the population size, and I is a rolling period formed with one or more units, wherein the number of units in the rolling period is less than or equal to the number of respondents in the respondent pool, wherein polling includes:
sending a poll with a set of questions;
receiving a first set of responses;
analyzing the first set of responses to determine a statistical distribution of the first set of responses;
storing the analysis of the first set of responses in the memory;
replacing a portion of the first set of respondents with a set of replacement respondents from an unpolled portion of the population to form a second respondent pool;
polling the second respondent pool;
receiving, by the polling computer, a second set of responses;
analyzing, by the polling computer, the second set of responses to determine a statistical distribution of the second set of responses;
comparing the analysis of the first set of responses to the analysis of the second set of response to determine a statistical relationship; and
storing, by the polling computer, the analysis of the first set of responses, the analysis of the second set of responses, and the statistical relationship in the memory.

14. The computer program product of claim 13, wherein the set of replacement respondents were previously polled more than one rolling period ago.

15. The computer program product of claim 13, wherein the set of replacement respondents is selected to replace respondents who did not respond to a current instance of the poll.

16. The computer program product of claim 15, wherein less than 10% of the first set of respondents are replaced, wherein the computer program product is executable to compare the analysis corresponding to the second set of respondents with the most recent previous analysis to identify information.

17. The computer program product of claim 13, wherein the computer program product is executable to compare the analysis corresponding to the second set of respondents with all previous analyses to obtain trending information.

18. The computer program product of claim 13, wherein the computer program product is executable to define a response tolerance time, wherein a response received by the polling computer after the response tolerance time is not analyzed.

19. A method of continuous polling of a population, the method comprising:
at a polling computer coupled to a network and having a processor and a memory storing a set of instructions executable by the processor, performing the steps of:
selecting a first respondent pool from a population based on a relationship with the operator of the polling computer;
sending, by the polling computer, a poll with a set of questions to the first respondent pool;
receiving, by the polling computer, a first set of responses;

analyzing, by the polling computer, the first set of responses to determine a statistical distribution of the first set of responses;

storing, by the polling computer, the first respondent pool and the analysis of the first set of responses in the memory;

replacing a portion of the first set of respondents with a set of replacement respondents from an unpolled portion of the population to form a second respondent pool;

polling the second respondent pool;

receiving, by the polling computer, a second set of responses;

analyzing, by the polling computer, the second set of responses to determine a statistical distribution of the second set of responses;

comparing the analysis of the first set of responses to the analysis of the second set of response to determine a statistical relationship; and storing, by the polling computer, the analysis of the first set of responses, the analysis of the second set of responses, and the statistical relationship in the memory.

* * * * *